(12) United States Patent
Adhikari et al.

(10) Patent No.: US 8,055,903 B2
(45) Date of Patent: *Nov. 8, 2011

(54) SIGNAL WATERMARKING IN THE PRESENCE OF ENCRYPTION

(75) Inventors: Akshay Adhikari, Basking Ridge, NJ (US); Sachin Garg, Green Brook, NJ (US); Anjur Sundaresan Krishnakumar, Rocky Hill, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/675,352

(22) Filed: Feb. 15, 2007

(65) Prior Publication Data
US 2008/0199009 A1 Aug. 21, 2008

(51) Int. Cl.
*H04N 7/167* (2006.01)
(52) U.S. Cl. .............. 713/181; 380/37; 380/43; 380/44; 380/205; 704/201
(58) Field of Classification Search .................. 713/181; 380/37, 43, 44
See application file for complete search history.

(56) References Cited

U.S. PATENT DOCUMENTS

| | | | |
|---|---|---|---|
| 3,956,615 A | 5/1976 | Anderson et al. | |
| 6,081,784 A | 6/2000 | Tsutsui | |
| 7,330,812 B2 * | 2/2008 | Ding | 704/200.1 |
| 2003/0154073 A1 * | 8/2003 | Ota et al. | 704/207 |
| 2004/0068399 A1 | 4/2004 | Ding | |

FOREIGN PATENT DOCUMENTS

| | | |
|---|---|---|
| EP | 1653405 A1 | 5/2006 |
| JP | 2000-083254 A | 3/2000 |
| JP | 2002-512494 A | 4/2002 |
| JP | 2003-283801 A | 10/2003 |
| JP | 2006-279428 A | 10/2006 |

(Continued)

OTHER PUBLICATIONS

Fridrich, J. et. al. (2002). Lossless data embedding for all image formats. Security and Watermarking of Multimedia Contents, San Jose, California, Jan. 2002, SPIE Photonics West, Electronic Imaging.*

(Continued)

*Primary Examiner* — Ashok Patel
*Assistant Examiner* — Brian Shaw
(74) *Attorney, Agent, or Firm* — Maldjian Law Group LLC; John P. Maldjian, Esq.

(57) ABSTRACT

A method is disclosed that enables the transmission of a digital message along with a corresponding information signal, such as audio or video. The supplemental information contained in digital messages can be used for a variety of purposes, such as enabling or enhancing packet authentication. In particular, a telecommunications device that is processing an information signal from its user, such as a speech signal, encrypts the information signal by performing a bitwise exclusive-or of an encryption key stream with the information signal stream. The device, such as a telecommunications endpoint, then intersperses the bits of the digital message throughout the encrypted signal in place of those bits overwritten, in a process referred to as "watermarking." The endpoint then transmits the interspersed digital message bits as part of a composite signal that also comprises the encrypted information bits. No additional bits are appended to the packet to be transmitted, thereby addressing compatibility issues.

14 Claims, 6 Drawing Sheets

FOREIGN PATENT DOCUMENTS

| | | |
|---|---|---|
| JP | 2006-287502 A | 10/2006 |
| KR | 20060096114 A | 9/2006 |

OTHER PUBLICATIONS

Mark Johnson et al., On Compressing Encrypted Data, IEEE, Oct. 2004.

Aoki, Naofumi, "A Band Extension Technique for G.711 Speech Using Steganography", "IEICE Transactions on Communications XP001246229", Jun. 2006, pp. 1896-1898, vol. E89-B, No. 6, Publisher: Institute of Electronics, Information and Communication Engineers.

Menezes et al., "Handbook of Applied Cryptography", "Chapter 7 XP001525007", 1997, p. 227, Publisher: CRC Press, Inc.

Menezes et al., "Handbook of Applied Cryptography", "Chapter 6 XP001525006", 1997, p. 193, Publisher: CRC Press, Inc.

Takagi et al., "Light Weight MP3 Watermarking Method for Mobile Terminals", "XP002561154", Nov. 6-11, 2005, pp. 443-446, Publisher: ACM Multimedia.

Mazurczyk et al., "New VoIP Traffic Security Scheme with Digital Watermarking", "Computer Safety, Reliability, and Security Lecture Notes in Computer Science XP019044250", Jan. 1, 2006, pp. 170-181, Publisher: LNCS Springer, Published in: DE.

Chen Ying, "CN Application No. 200810005652.9 Office Action Mar. 11, 2010", , Publisher: SIPO, Published in: CN.

Billet, Olivier, "EP Application No. 08001414.5 Extended European Search Report Jan. 5, 2010", , Publisher: EPO, Published in: EP.

"KR Application No. 2008-0014023 Office Action Jan. 29, 2010", , Publisher: KIPO, Published in: KR.

Kanazawa, H., "JP Application No. 2008-033911 Office Action Nov. 29, 2010", , Publisher: JPO, Published in: JP.

Engel, Lawrence J., "CA Application No. 2,619,811 Office Action Mar. 24, 2011", , Publisher: CIPO, Published in: CA.

Shaw, Brian, "U.S. Appl. No. 11/675,345 Panel Decision May 18, 2011", , Publisher: USPTO, Published in: US.

Geissler, Christian, "EP Application No. 08 002 076.1 Office Action Apr. 21, 2011", , Publisher: EPO, Published in: EP.

Tabei, K., "JP Application No. 2008-034175 Office Action May 11, 2011", , Publisher: JPO, Published in: JP.

\* cited by examiner

Endpoint 202-*m*

Endpoint 202-*m*

SIGNAL WATERMARKING IN THE PRESENCE OF ENCRYPTION

FIELD OF THE INVENTION

The present invention relates to telecommunications in general, and, more particularly, to transmitting a digital message along with an information signal.

BACKGROUND OF THE INVENTION

Modern telecommunications systems feature the routing of media information signals, such as audio or video, over one or more packet-based networks, such as the Internet. In Voice over Internet Protocol (or "VoIP"), for example, voice signals from the voice conversations to be routed are digitized and formatted into data packets, which are then transmitted through the network. A telecommunications network that is based on VoIP is able to transmit voice conversations between telecommunications endpoints that are able to access the network.

Each telecommunications endpoint, whether voice-capable or not, is a packet-based device that is capable of exchanging information with other devices; the endpoint exchanges information in a manner similar to how a personal computer is able to exchange information with other computers throughout the Internet. Consequently, the endpoint is vulnerable to many of the same or similar packet attacks as is a personal computer, such as "Denial-of-Service" (DoS) attacks. In fact, there are many sources of potential packet attacks that can be directed at an endpoint from within any of a variety of networks that are interconnected to the network used by the endpoint.

To improve the ability of the endpoint to withstand packet attacks, some type of authentication is necessary. Authentication enables the endpoint to decide which of the arriving packets are legitimate and which should be discarded. A standard protocol known as Secure Real-time Transport Protocol (SRTP) describes the procedures for performing one method of authentication. However, there is a drawback to this protocol. In order to authenticate a packet, it is necessary to compute a message digest over the header and the payload of the packet. This computation requires a significant amount of processing at the endpoint and can possibly overload the endpoint's processor.

Simpler schemes for authenticating each packet are available that require fewer processing resources. However, because of restrictions specified by SRTP and firewall behavior in the networks, it is typically not possible to append the additional information needed by the simpler schemes. Additionally, other applications unrelated to authentication can require the transmission of supplemental information, such as bits to convey additional control information for a particular feature. The problem is that unused bit positions in existing messages often do not exist and appended bits often cannot be transmitted, in order to convey the supplemental information.

Furthermore, due to processing path complexity, knowing where in the processing path to consider introducing the supplemental information to be sent can be challenging. As depicted in FIG. 1, transmit processing path 100 comprises information compression, as performed by compressor 111; encryption of the compressed signal, as performed by encryptor 112; and channel coding of the encrypted signal, as performed by channel coder 113. With respect to the encryption processing, a block of data to be encrypted is typically sent through many stages of encryption operations that involve secret keys. In this case, every bit of the output data is affected by every bit of the input data. Care must be taken as to where supplemental information is added to the processed signal, as tampering with encrypted data can lead to disastrous results during the decryption of the processed signal at the receive node.

What is needed is a technique to free up additional bit positions in each packet in a packet stream, for sending digital messages that contain supplemental information related to authentication or other purposes, while maintaining the integrity of the processed signal and without some of the disadvantages in the prior art.

SUMMARY OF THE INVENTION

The present invention enables the transmission of a digital message along with a corresponding information signal, such as audio or video. The supplemental information contained in digital messages can be used for a variety of purposes, such as enabling or enhancing packet authentication. In particular, a telecommunications device that is processing an information signal from its user, such as a speech signal, encrypts the information signal by performing a bitwise exclusive-or of an encryption key stream with the information signal stream. The device, such as a telecommunications endpoint, then intersperses the bits of the digital message throughout the encrypted signal in place of those bits overwritten, in a process referred to as "watermarking." The endpoint then transmits the interspersed digital message bits as part of a composite signal that also comprises the encrypted information bits. In this way, no additional bits are appended to the packet to be transmitted, thereby addressing the issue of compatibility with existing protocols and firewalls.

What is different about the technique of the illustrative embodiment, as compared to some techniques in the prior art, is that the watermarking occurs after the encryption process. The key to the successful combining of the supplemental bits in the digital message with the encrypted media information bits is in the bitwise exclusive-or operation that is performed. This operation guarantees that only one bit in the encrypted stream affects only the corresponding bit in the decrypted information stream. This is because the decryption process in the receiving node is simply the bitwise exclusive-or with the same key stream used by the transmitting node. Watermarking after encryption is advantageous in that for some digital processing paths, it is easier to append the watermarking stage near the end of the path, instead of having to embed the watermarking between two existing stages (i.e., information coding and encryption) of the digital signal processing.

In some embodiments of the present invention, a message digest that can be used for authenticating the transmitted packet at the receiving node is also computed and transmitted. The digest is computed after the watermarking has taken place, which ensures that the modified message will be considered authentic by the receiving node when it performs authentication processing. Advantageously, the use of the message digest, in combination with the watermarking of the media information stream with authentication-related digital messages, can enhance the resiliency of a receiving endpoint to packet attacks.

The illustrative embodiment of the present invention comprises: encrypting an information signal, resulting in an encrypted signal that is M bits in length; substituting N bits of the encrypted signal with at least a portion of a digital message, the substitution of the N bits of the encrypted signal resulting in a composite signal; and transmitting the composite signal to a receiving node; wherein M and N are positive integers and N is less than M

DETAILED DESCRIPTION

Figure 1:
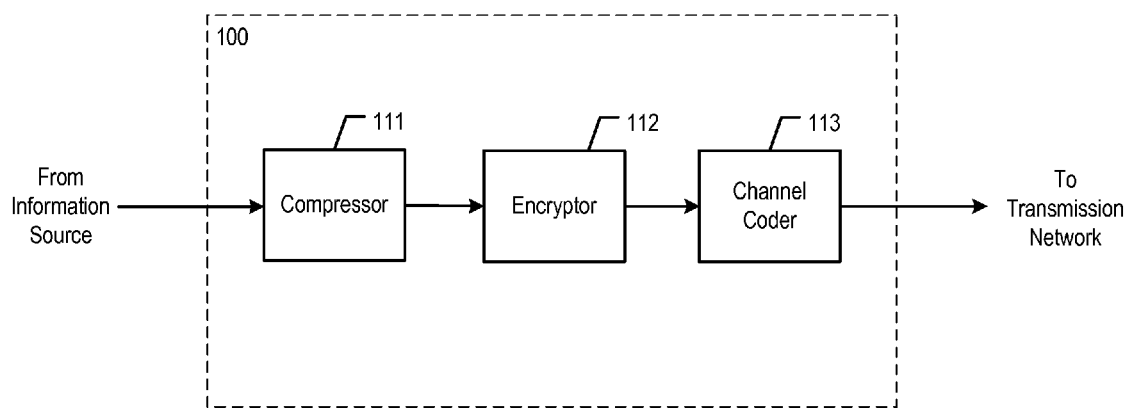
FIG. 1 depicts transmit processing path 100 in the prior art.
Figure 2:
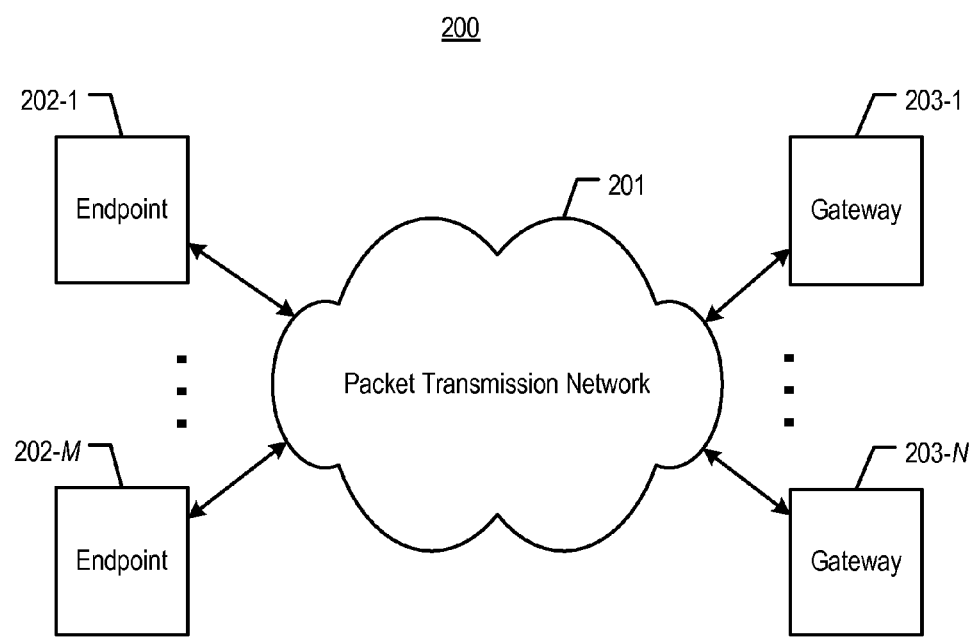
FIG. 2 depicts a schematic diagram of telecommunications system 200, in accordance with the illustrative embodiment of the present invention.

FIG. 2 depicts a schematic diagram of telecommunications system 200, in accordance with the illustrative embodiment of the present invention. System 200 routes voice conversations, or other types of media information signals such as video and other types of audio (e.g., music, etc.), between network elements such as telecommunications endpoints. System 200 comprises: packet transmission network 201; telecommunications endpoints 202-1 through 202-M; and gateways 203-1 through 203-N, wherein M and N are positive integers. All of the elements depicted in FIG. 2 are interconnected as shown.

Packet transmission network 201 is used to transport one or more types of media, such as Voice over Internet Protocol (or "VoIP"), for the subscribers of a service provider. Network 201 comprises one or more transmission-related nodes such as routers that are used to direct data packets that carry processed information signals (e.g., voice packets, etc.) from one or more sources to the correct destinations of those packets. Network 201 is capable of handling Internet Protocol-based messages that are transmitted among the network elements that have access to network 201, such as the various telecommunications endpoints and gateways throughout system 200. Although network 201 in the illustrative embodiment is a Voice-over-IP service provider's network, network 201 could alternatively be the Internet, some other type of Internet Protocol-based network, or some other type of packet-based network.

In some embodiments, network 201 comprises one or more local area networks (or "LAN"), which provide for the local distribution of signals, such as in an enterprise system. For example, each local area network can enable one or more telecommunications endpoints to access a wider network. Each local area network comprises networking equipment such as hubs, bridges, and switches, and operates in accordance with a networking protocol such as Ethernet, IEEE 802.3, IEEE 802.11, and so forth.

Telecommunications endpoint 202-m, for m=1 through M, is a communication appliance such as a deskset, a conferencing unit, a wireless terminal, a desktop or portable computer (i.e., "softphone"), an Internet phone, and so forth. As a packet-based device, telecommunications endpoint 202-m is capable of exchanging information with other devices in telecommunications system 200, in a manner that is similar to how a personal computer is able to exchange information with other computers throughout the Internet.

Endpoint 202-m is capable of digitizing voice signals from its user and formatting the digitized signals into transmittable data packets through an audio compressor/decompressor (or "CODEC") circuit and through an encryptor, as described below and with respect to FIG. 3. Similarly, the CODEC circuit of endpoint 202-m is also capable of receiving data packets and converting the information contained within those packets into voice signals that are understandable by the endpoint's user, as described below and respect to FIG. 4. Furthermore, endpoint 202-m is capable of performing the tasks described below and with respect to FIGS. 5 and 6, in accordance with the illustrative embodiment of the present invention. It will be clear to those skilled in the art, after reading this specification, how to make and use endpoint 202-m.

Gateway 203-n, for n=1 through N, is a networking device that connects packet transmission network 201 with the network that is associated with a particular gateway (e.g., the Public Switched Telephone Network, etc.) by forwarding data packets between the two networks. Each gateway 203-n acts as a translator between the two different types of networks to which it is connected (i.e., packet network 201 and another network). Because gateway 203-n connects two different types of networks together, one of its main functions is to convert between the different transmission and coding techniques used across the two networks. Therefore, gateway 203-n is also capable of converting between compressed and decompressed signals (e.g., via a "CODEC" circuit, etc.). In some embodiments, gateway 203-n is capable of executing at least some of the tasks described below and with respect to FIGS. 4 and 5. It will be clear to those skilled in the art, after reading this specification, how to make and use gateway 203-n.

In accordance with the illustrative embodiment, the devices of system 200 are capable of wired communications and of operating in a service provider environment. As those who are skilled in the art will appreciate, in some alternative embodiments some or all of the devices of system 200 are capable of wireless communications, and of operating in various types of networks (e.g., public, private, etc.). Furthermore, in some alternative embodiments devices other than endpoints or gateways are capable of performing the tasks described below and with respect to FIGS. 4 and 5. It will be clear to those skilled in the art, after reading this specification, how to apply the techniques of the illustrative embodiment to other types of devices and in other operating environments.

Figure 3:
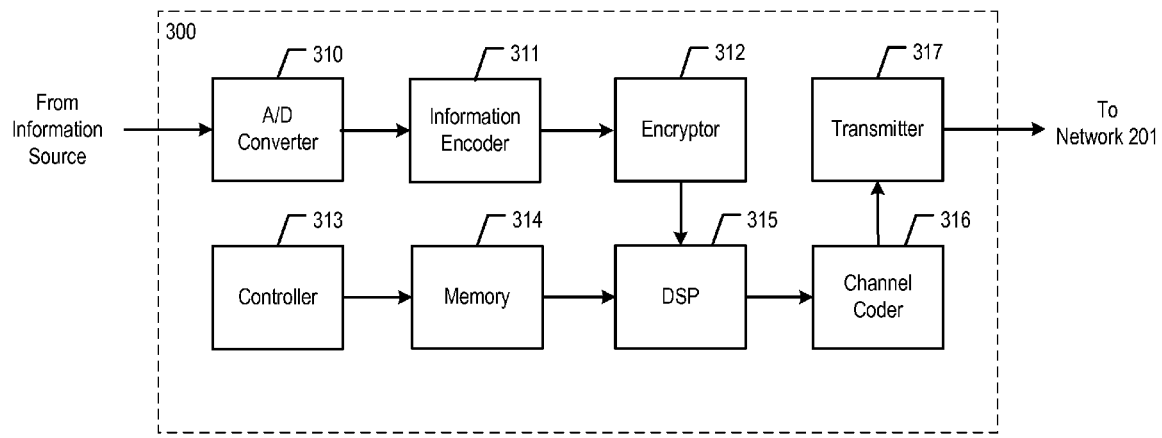
FIG. 3 depicts a block diagram of transmit processing path 300 of telecommunications endpoint 202-m, in accordance with the illustrative embodiment of the present invention.

FIG. 3 depicts a block diagram of transmit processing path 300 of telecommunications endpoint 202-m, in accordance with the illustrative embodiment of the present invention. Transmit path 300 processes an information signal, such as a voice signal from the endpoint's user, which can be acquired by a transducer such a microphone. If not already in digital form, analog-to-digital converter 310 converts the information signal from analog form to digital form.

After being digitized, information encoder 311 encodes the information signal to achieve data compression. In the illustrative embodiment, in which the information signal is a voice signal, encoder 311 comprises a vocoder, a type of CODEC known in the art, which performs the information compression. The vocoder takes the time-series waveform data and converts the data to digital symbols corresponding to speech pattern characteristics.

In accordance with the illustrative embodiment of the present invention, encoder 311 operates in accordance with the ITU G.729 protocol standard, as is known in the art. The ITU G.729 protocol standard is described in ITU-T Recommendation G.729, "Coding of Speech at 8 Kbit/s using Conjugate-Structure Algebraic-Code-Excited Linear-Predication (CS-ACELP)," March 1996, as well as the corresponding Annexes (i.e., Annex A, Annex B, and so on), all of which are incorporated herein by reference. In some alternative embodiments, encoder 311 can a model-based codec other than one that is based on ITU G.729 or a waveform-based codec such as one that is based on ITU G.711.

Encryptor 312 encrypts the compressed signal in well-known fashion, resulting in an encrypted information signal frame. The encryption task consists of performing a bitwise exclusive-or of a key stream and the bit stream of the compressed audio signal, frame-after-frame.

Concurrently, transmit controller 313 determines if a supplemental signal (e.g., for control purposes, etc.) needs to be transmitted along with the encoded information signal to the receiving node. For example, a supplemental signal might be an authentication code, which can be used by the receiving node to authenticate the packets that it receives. Controller 313 either acquires the supplemental signal from an outside source or generates the signal itself. When a supplemental signal needs to be transmitted, controller 313 writes to memory device 314 a digital message that represents the supplemental signal.

Digital signal processor 315 receives the compressed and encrypted information signal frames from encryptor 312. Processor 315 also reads the digital message from memory 314 and substitutes a selected combination of bits in the encoded information signal with the bits from the digital message. In accordance with the illustrative embodiment, the combination of bits selected is based on prior analysis. In some alternative embodiments, processor 315 determines the combination of bits by evaluating data from the encoded information signal. In doing so, processor 315 determines which of the information signal bits can be substituted (i.e., overwritten) with bits received from controller 314 as described below, based on one or more characteristics of the encoder, such as the perceptual significance of each bit in the encoded information signal. The signal that results from the substitution is a composite signal that comprises the information signal and supplemental signal.

Processor 315 also computes a message digest, as is known in the art. The message digest is based on at least a portion of the composite signal. Processor 315 then includes the message digest as part of the composite signal to be transmitted to an endpoint, which can use the message digest for authentication purposes.

Channel coder 316 prepares the composite signal for transmission by coding the frame for forward error correction and formatting the frame for transmission. The channel-coded, composite signal is sent to transmitter 317, which then transmits the signal in well-known fashion to network 201.

Figure 4:
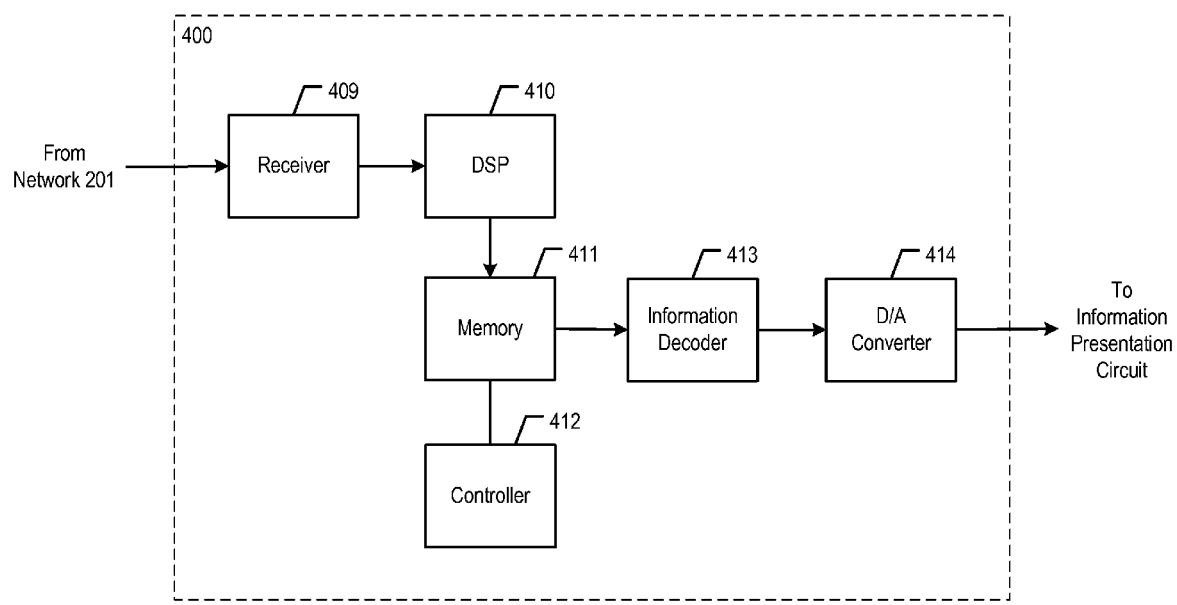
FIG. 4 depicts a block diagram of receive processing path 400 of telecommunications endpoint 202-m, in accordance with the illustrative embodiment of the present invention.

FIG. 4 depicts a block diagram of receive processing path 400 of telecommunications endpoint 202-m, in accordance with the illustrative embodiment of the present invention. Receive path 400 receives packets, each of which comprises one or more composite signal frames, from a transmitting endpoint or from another packet-capable device (e.g., gateway 203-n, etc.); path 400 then processes the received composite signal frames. In particular, receiver 409 receives the packet signals from network 201, in well-known fashion. For each received frame, digital signal processor 410 detects and corrects errors, and decrypts the encrypted bits. Processor 410 also processes the message digest, separates the supplemental bits from the encoded information bits, and stores those bits into memory 411.

Receive controller 412 accesses the supplemental bits as needed. For example, if the supplemental bits represent an authentication code, controller 412 uses the authentication code to determine the authenticity of the received encoded information signal.

Information decoder 413 decodes (decompresses) the encoded information signal to achieve a reconstructed version of the original information signal. In the illustrative embodiment, in which the information signal is a voice signal, decoder 413 comprises a vocoder, which is a type of CODEC known in the art and which performs the information decompression. The vocoder takes the digital data present in the received encoded information signal, which data correspond to speech pattern characteristics, and converts the data to time-series waveform data.

In accordance with the illustrative embodiment of the present invention, decoder 413 operates in accordance with the ITU G.729 protocol standard, as is known in the art.

Continuing along receive path 400, digital-to-analog converter 414 converts the decoded information signal from digital form to analog form. Afterwards, the analog information signal can be additionally processed for eventual presentation to the receiving endpoint's user, such as by an acoustic speaker.

Figure 5:
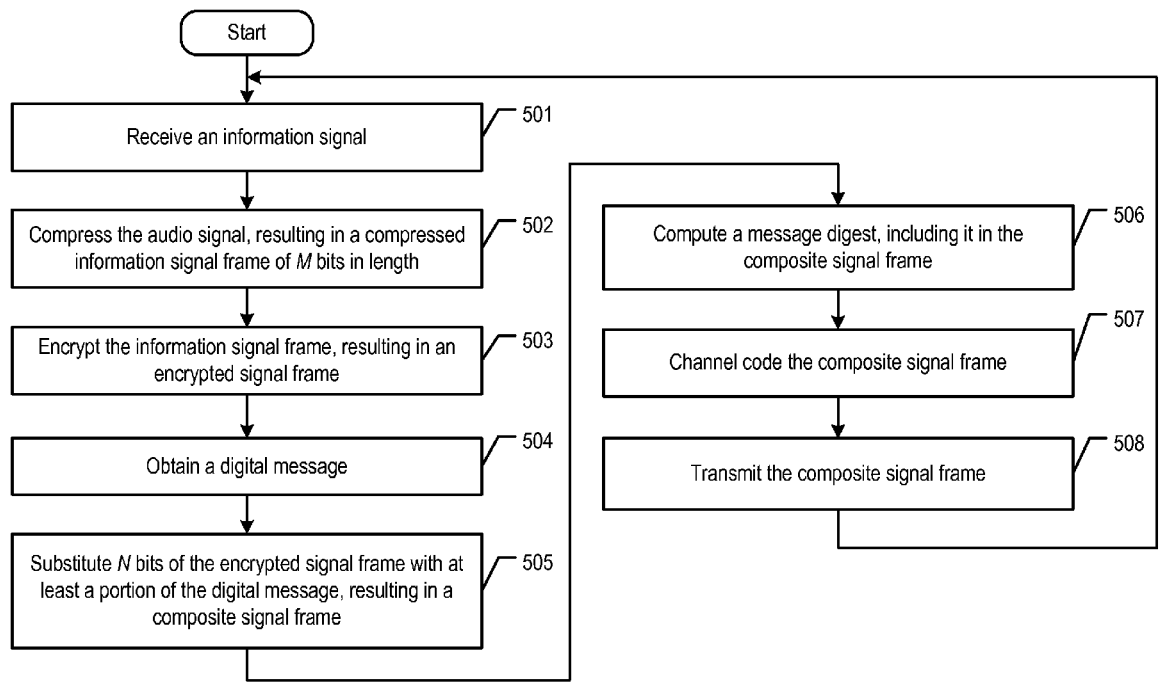
FIG. 5 depicts a flowchart of the salient tasks that pertain to the processing of an information signal along transmit processing path 300.
Figure 6:
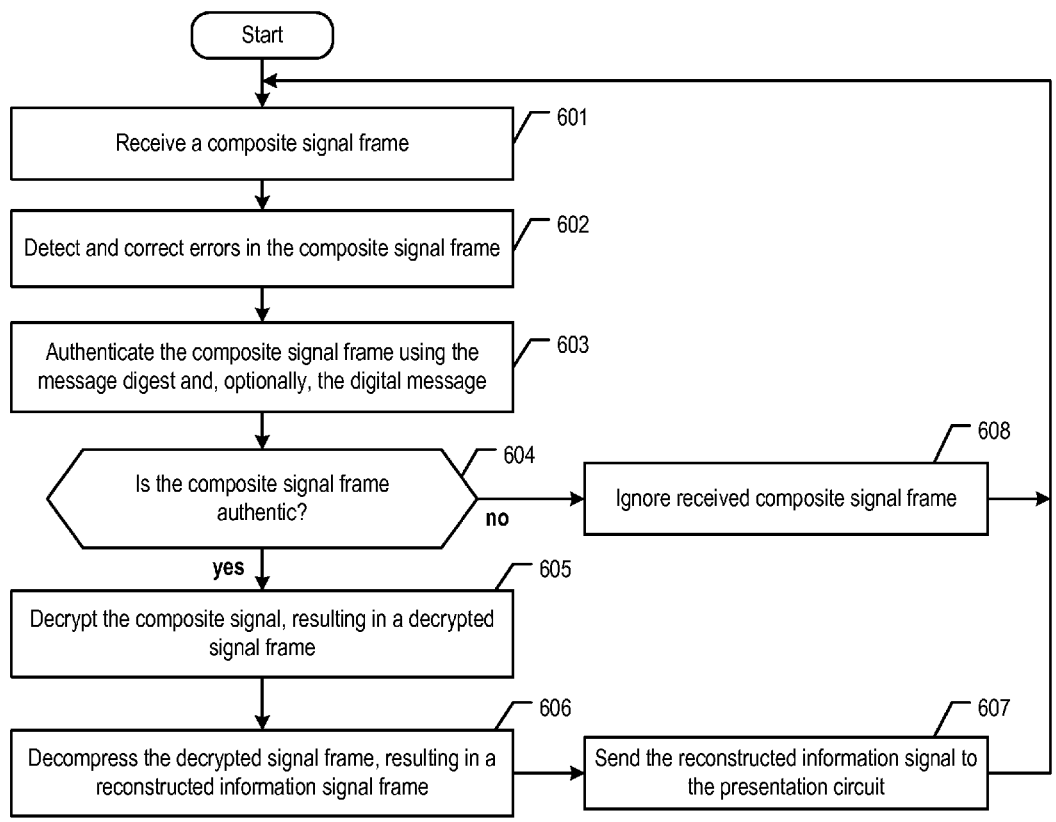
FIG. 6 depicts a flowchart of the salient tasks that pertain to the processing of an information signal along receive processing path 400.

FIGS. 5 and 6 depict flowcharts of the salient tasks that are executed by telecommunications endpoint 202-m, in accordance with the illustrative embodiment of the present invention. The salient tasks in FIG. 5 pertain to the processing of the information signal along transmit processing path 300 depicted in FIG. 3. The salient tasks in FIG. 6 pertain to the processing of the information signal along receive processing path 400 depicted in FIG. 4. For pedagogical purposes, the example that follows illustrates a call session that is in progress, in which endpoint 202-1 is sending a stream of audio packets to endpoint 202-2. In the example, transmitting endpoint 202-1 is performing the tasks with respect to FIG. 5; and receiving endpoint 202-2 is performing the tasks with respect to FIG. 6. Some of the tasks that appear in FIGS. 5 and 6 can be performed in parallel or in a different order than that depicted, as those who are skilled in the art will appreciate.

In some embodiments, as those who are skilled in the art will appreciate, endpoint 202-2 might be concurrently sending a stream of audio packets back to endpoint 202-1—in which case, endpoint 202-2 also performs the tasks with respect to FIG. 5 and endpoint 202-1 also performs the tasks with respect to FIG. 6. Alternatively, as those who are skilled in the art will also appreciate, other nodes in system 200 can perform the tasks depicted in FIGS. 5 and 6. Instead of audio packets, in some alternative embodiments, the endpoints exchange information signals that convey other than audio information, such as video information signals.

Referring to FIG. 5, transmit processing path 300 of endpoint 202-1 receives a segment of an audio signal in well-known fashion at task 501.

At task 502, transmit path 300 compresses the audio signal in accordance with the ITU G.729 protocol standard, providing a compressed audio signal frame that is M bits in length, wherein M is equal to 80 in this case.

At task 503, transmit path 300 encrypts the compressed audio signal frame in well-known fashion, resulting in an encrypted signal frame. The encryption task consists of performing a bitwise exclusive-or of a key stream and the bit stream of the compressed audio signal, frame-after-frame. Various related techniques for encryption are well-known in the art and can be applied here. In some alternative embodiments, transmit path 300 encrypts the signal before compressing the signal.

At task 504, transmit path 300 obtains a digital message to be transmitted along with the audio signal. For example, controller 313 computes an authentication code based on a portion of the audio signal frame, a shared key, and a hashing algorithm. Various other techniques for computing an authentication code are well-known in the art and can be applied here. As those who are skilled in the art will appreciate, the digital message can contain other data to be transmitted, such as closed-captioning information that is to coincide with the audio information signal also being sent.

At task 505, in accordance with the illustrative embodiment, transmit path 300 substitutes N bits of the M-bit encrypted audio signal with at least a portion of the digital message, resulting in a composite signal frame. An empirical study made in conjunction with the present invention shows that in each 80-bit frame of the encoded audio information signal received from encoder 211, processor 215 can substitute the bits at one or more of bit positions 39, 40, 68, 69, 30, and 41 with relatively low impact on the perceived audio quality; in the frame, the bits at bit positions 1 and 80 are the first and last bits, respectively, to be transmitted. As an example, processor 215 might substitute bit numbers 39, 40, 68, and 69 for a total of four bits in the frame (i.e., N is equal to four). As a second example, processor 215 might substitute bit numbers 39, 40, 68, 69, 30, and 41 for a total of six bits in the frame (i.e., N is equal to six).

In the bit stream ordering in the illustrative embodiment, bits 39 and 40 are the least significant bits of the fourth codebook pulse position in the first subframe within each 80-bit frame, in accordance with the ITU G.729 protocol standard. Similarly, bits 68 and 69 are the least significant bits of the fourth codebook pulse position in the second subframe. Bit 30 is the least significant bit of the first codebook pulse position in the first subframe. Finally, bit 41 is the sign bit of a codebook pulse in the first subframe. The concepts of codebook-related bits and the generated subframes that contain those bits are well-known in the art. As those who are skilled in the art will appreciate, the bits that are substituted can be one or more of the least significant, fixed-codebook index bits of one or more subframes in each generated frame; this applies even if the model-based audio coder being used operates in accordance with a protocol standard other than ITU G.729.

At task 506, transmit path 300 computes a message digest based on at least a portion of the composite signal frame, in well-known fashion. In some embodiments, the computing of the message digest is performed in accordance with the Secure Real-time Transport Protocol (SRTP). Transmit path 300 includes the message digest as part of the composite signal frame.

At task 507, transmit path 300 channel codes the composite signal frame in well-known fashion. The channel coding is performed to enable error detection and correction on the part of receiving endpoint 202-2. In some alternative embodiments, transmit path 300 performs channel coding before the bit substitution described above and with respect to task 505.

At task 508, transmit path 300 transmits the composite signal frame to endpoint 202-2. After task 508, task execution proceeds back to task 501 to process the next frame's worth of audio information signal.

Referring to FIG. 6, at task 601 receive processing path 400 of endpoint 202-2 receives the composite signal frame transmitted by endpoint 202-1.

At task 602, receive path 400 detects and corrects errors in the received composite signal frame.

At task 603, receive path 400 authenticates the composite signal frame using the received message digest or any authenticated-related information in the received digital message, or both. Receive path 300 can compare the received message digest with a computed message digest, where the computed message digest is based on the received information bits, a shared key, and a hashing algorithm. Similarly, receive path 300 can compare the information in the received digital message (e.g., an authentication code, etc.) with computed data.

At task 604, if the composite signal frame has been authenticated—for example, the received message digest matches the computed message digest—task execution proceeds to task 605. Otherwise, task execution proceeds to task 608.

At task 605, receive path 400 decrypts the composite signal, which results in a decrypted signal frame. In accordance with the illustrative embodiment, the decryption process is a bitwise exclusive-or with the same key stream that was used by transmitting endpoint 202-1 to encrypt the signal. As a result, except for the bits that were overwritten with the digital message bits, the bits of the compressed audio signal are recovered intact.

At task 606, receive path 400 decompresses (i.e., reconstructs) an audio signal from the decrypted signal frame. In some embodiments, if bits corresponding to a digital message are present in the decrypted signal frame, the values of some or all of those bits are modified to improve the results of the information reconstruction.

At task 607, receive path 400 sends the reconstructed audio signal to an audio circuit for additional processing, in well-known fashion. Task execution then proceeds back to task 601 to process the next frame received from endpoint 202-1.

At task 608, in the case of the composite signal frame not being authentic, receive path 400 ignores the received composite signal frame. Task execution then proceeds back to task 601 to process the next frame received from endpoint 202-1.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of communicating a digital message with an information signal, the method comprising:

encoding the information signal using a model-based coder, the encoding resulting in an encoded signal having a frame that is M bits in length;

encrypting the encoded signal based on a bitwise exclusive-or operation of the encoded signal with a key stream, the encrypting resulting in an encrypted signal that is also M bits in length;

substituting a predetermined combination of N bits of the encrypted signal with at least a portion of the digital message, the substitution of the N bits resulting in a composite signal, wherein the predetermined combination of N bits is determined at least in part based on a position, as encoded by the model-based coder, of each of the N bits within the M-bit frame of the encoded signal; and transmitting the composite signal to a receiving node;

wherein M and N are positive integers and N is less than M.

2. The method of claim 1 wherein each of the N bits is further determined according to a relative user-perceptible impact thereof.

3. The method of claim 1 wherein the predetermined combination of N bits comprises at least one of (i) a least-significant bit of a first fixed-codebook-subframe in the M-bit frame of the encoded signal, (ii) a least-significant bit of a second fixed-codebook-subframe in the M-bit frame of the encoded signal, (iii) a second-least-significant bit of the first fixed-codebook-subframe in the M-bit frame of the encoded signal, (iv) a second-least-significant bit of the second fixed-codebook-subframe in the M-bit frame of the encoded signal, (v) a least-significant bit of the first codebook pulse position in the first fixed-codebook-subframe in the M-bit frame of the encoded signal, and (vi) a sign bit of a codebook pulse of the first fixed-codebook-subframe in the M-bit frame of the encoded signal.

4. The method of claim 1 wherein the encoding of the information signal is performed in accordance with the ITU G.729 protocol standard.

5. The method of claim 1 wherein the predetermined combination of N bits comprises at least one of bits 30, 39, 40, 41, 68, and 69 within the M-bit frame of the encoded signal as encoded by the model-based coder, and
wherein M =80.

6. The method of claim 1 further comprising channel coding the encrypted signal prior to the substitution of the N bits.

7. The method of claim 1 further comprising computing a message digest that is based on at least a portion of the composite signal that resulted from substituting the predetermined combination of N bits, wherein the transmitting to the receiving node also comprises transmitting the message digest.

8. The method of claim 7 wherein the computing of the message digest is performed in accordance with the Secure Real-time Transport Protocol.

9. A method of communicating a digital message with an information signal, the method comprising:
encoding the information signal using a model-based coder, the encoding resulting in an encoded signal having a frame that is M bits in length;
encrypting the encoded signal based on a bitwise exclusive-or operation of the encoded signal with a key stream, resulting in an encrypted signal that is also M bits in length;
substituting a predetermined combination of N bits of the encrypted signal with at least a portion of the digital message, the substitution of the N bits of the encrypted signal resulting in a composite signal, wherein the predetermined combination of N bits is determined at least in part based on (i) a position, as encoded by the model-based coder, of each of the N bits within the M-bit frame of the encoded signal, and (ii) a relative user-perceptible impact thereof;
computing a message digest that is based on at least a portion of the composite signal that resulted from substituting the predetermined combination of N bits; and
transmitting the composite signal and the message digest to a receiving node;
wherein M and N are positive integers and N is less than M.

10. The method of claim 9 wherein the predetermined combination of N bits comprises at least one of (i) a least-significant bit of a first fixed-codebook-subframe in the M-bit frame of the encoded signal, (ii) a least-significant bit of a second fixed-codebook-subframe in the M-bit frame of the encoded signal, (iii) a second-least-significant bit of the first fixed-codebook-subframe in the M-bit frame of the encoded signal, (iv) a second-least-significant bit of the second fixed-codebook-subframe in the M-bit frame of the encoded signal, (v) a least-significant bit of the first codebook pulse position in the first fixed-codebook-subframe in the M-bit frame of the encoded signal, and (vi) a sign bit of a codebook pulse of the first fixed-codebook-subframe in the M-bit frame of the encoded signal.

11. The method of claim 9 wherein the encoding of the information signal is performed in accordance with the ITU G.729 protocol standard.

12. The method of claim 9 wherein the predetermined combination of N bits comprises at least one of bits 30, 39, 40, 41, 68, and 69 within the M-bit frame of the encoded signal as encoded by the model-based coder, and
wherein M =80.

13. The method of claim 9 further comprising channel coding the encrypted signal prior to the substitution of the N bits.

14. The method of claim 9 wherein the computing of the message digest is performed in accordance with the Secure Real-time Transport Protocol.

* * * * *